United States Patent [19]
Nolan-Brown

[11] Patent Number: 5,285,321
[45] Date of Patent: Feb. 8, 1994

[54] DEVICE FOR OBSERVING INFANT IN REAR SEAT

[76] Inventor: Patricia Nolan-Brown, 27 Parker Rd., Wakefield, Mass. 01880

[21] Appl. No.: 826,104
[22] Filed: Jan. 27, 1992
[51] Int. Cl.⁵ .................. B60R 1/04; G02B 5/08; G02B 7/18
[52] U.S. Cl. ..................... 359/857; 359/871; 248/467
[58] Field of Search .............. 359/844, 857, 870, 871, 359/872; 248/466, 467, 475.1, 476

[56] References Cited

U.S. PATENT DOCUMENTS

| | | | |
|---|---|---|---|
| 3,273,891 | 9/1966 | Grim, Jr. | 248/467 |
| 4,624,539 | 11/1986 | King et al. | 248/467 |
| 4,702,572 | 10/1987 | Cossey | 359/876 |
| 4,712,892 | 12/1987 | Masucci | 359/871 |
| 4,733,956 | 3/1988 | Erickson | 359/863 |
| 4,902,118 | 2/1990 | Harris | 359/871 |
| 4,909,618 | 3/1990 | Gardner | 359/872 |
| 5,103,347 | 4/1992 | Lumbra et al. | 359/871 |

Primary Examiner—Bruce Y. Arnold
Assistant Examiner—R. D. Shafer
Attorney, Agent, or Firm—John P. McGonagle

[57] ABSTRACT

A non-glass reflective surface is mounted near the top of the rear seat of a motor vehicle in such a way that the driver of the vehicle, by looking in the rear view mirror, can observe an infant in a safety seat wherein the infant is positioned facing the rear of the vehicle. This mirror is attached to the rear seat my means of a large safety pin and is further secured by means of strips of Velcro.

6 Claims, 2 Drawing Sheets

DEVICE FOR OBSERVING INFANT IN REAR SEAT

BACKGROUND OF THE INVENTION

This invention relates to device for observing an infant in a rearwardly facing safety seat located in the rear seat of a vehicle.

The "Child Passenger Protection Act" which became law in 1983, requires that an infant travelling in a vehicle be secured in a safety seat that is itself fastened to the center of the rear seat of the vehicle by means of seat belts. It has become common practice, as a result of the recommendations of child safety advocates, to position the car safety seat such that the infant faces the rear of the vehicle.

These car safety seats are often constructed with side panels that can obstruct any view of the infant when the infant is in the car seat.

This presents problems, however, when the driver or passenger in the front seat of the vehicle, wishes or needs to check on the condition of the infant in the car seat. The driver must either stop the vehicle and perhaps even get out of the vehicle. The passenger must turn her/his body and lean back over the front seat. In either case, the situation is dangerous or inconvenient.

If the infant is crying or otherwise giving indications of distress, the driver, if alone, is put in the position of having to stop the car in order to check on the infant. This can be inconvenient at best, and dangerous at worst is there is no safe roadside location to which the driver may safely drive the vehicle.

If the infant is quiet, it is important that the driver be able to monitor it to ensure that nothing untoward has happened to the infant.

Several earlier patents disclose various approaches to solving this problem. U.S. Pat. No. 4,702,572 issued Oct. 27, 1987 to Cossey discloses a rigid frame which fits over the top of the rear seat to which a mirror is attached by a rigid vertical telescoping sleeve. The rigid construction of this device presents a potential danger to the infant in the event of an accident or rapid deceleration of the vehicle.

In U.S. Pat. No. 4,712,892 issued Dec. 15, 1987 to Masucci a mirror for observing a rearwardly facing child in the rear seat of a vehicle is mounted on the rear seat back and is positioned at approximately the same height as the infant's head. Since positioning the infant facing the rear seat is intended to protect the infant in the event of an accident by insuring that the infant will be projected toward the soft seat back, the location of this mirror can present a danger in that, in the event of an accident, the infant would be projected into it rather than the soft seat back. It is possible that the infant could kick this mirror with its feet dislodging it and making it useless. If the infant's feet are bare, and the mirror is hot as a result of being in the sunlight, the infant could burn its feet. It is possible that the infant could shatter this mirror possibly causing injury to the infant. The large reflective surface of this mirror could also present a problem of glare into the infant's eyes and also glare into the driver's eyes when using it to check on the infant. The mirror in this patent also requires a car seat to hold it in place.

U.S. Pat. No. 4,733,956 issued Mar. 29, 1988 to Erickson discloses a dome-shaped mirror that is mounted by means of suction cups to the roof or at the top of the rear window of the vehicle. In a station wagon or van, the distance between this location and the driver's rear-view mirror is too great to permit viewing of the infant and presents the potential of danger to the infant if it the suction is insufficient to secure the mirror in place. The mirror also vibrates because the mirror is not braced by anything but the suction cup.

U.S. Pat. No. 4,902,118 issued Feb. 20, 1990 to Harris discloses a mirror that attaches to the rear seat of a vehicle by straps that surround the rear seat back. Positioning the mirror itself involved adjusting the straps both vertically and horizontally. This can be a cumbersome procedure.

U.S. Pat. No. 4,909,618 discloses a mirror that is positioned on the rear shelf of an automobile in front of the third taillight. Because it is situated 5½ inches above this rear shelf it has the potential for obstructing the driver's view. Because of it's attachment mechanism, it cannot be installed in station wagons or other vehicles with rear doors. It is requires a permanent installation.

SUMMARY OF THE INVENTION

In view of the foregoing disadvantages inherent in the known types of devices now present in the prior art, the present invention provides an improved device for observing an infant in an automobile rear seat. As such, the general purpose of the present invention, which will be described subsequently in greater detail, is to provide a new, improved, inexpensive, easy-to-install device by which the driver of a vehicle, without turning her head and losing eye contact with the road ahead, can observe an infant in a rear-facing safety seat placed in the rear seat of the vehicle.

To attain this, the present invention provides a lightweight rectangular device incorporating a reflective surface on one side, which device is removably attached to the rear seat back of a vehicle by an adjustable single strap made of a strong synthetic fabric secured to the non-reflective surface of the device. The positioning of the reflective surface to allow viewing of the infant in the car safety seat by the driver of the vehicle is accomplished by adjusting the length of the strap.

It is, therefore, a further object of this invention to provide such a device that is safe for the infant in the event of an accident or sudden deceleration.

It is another object of this invention to provide such a device that does not require a permanent installation in the vehicle.

It is still another object of this invention to provide such a device that can be used effectively in a variety of vehicles including automobiles as well as vehicles that have a rear door such as station wagons, and mini-vans.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
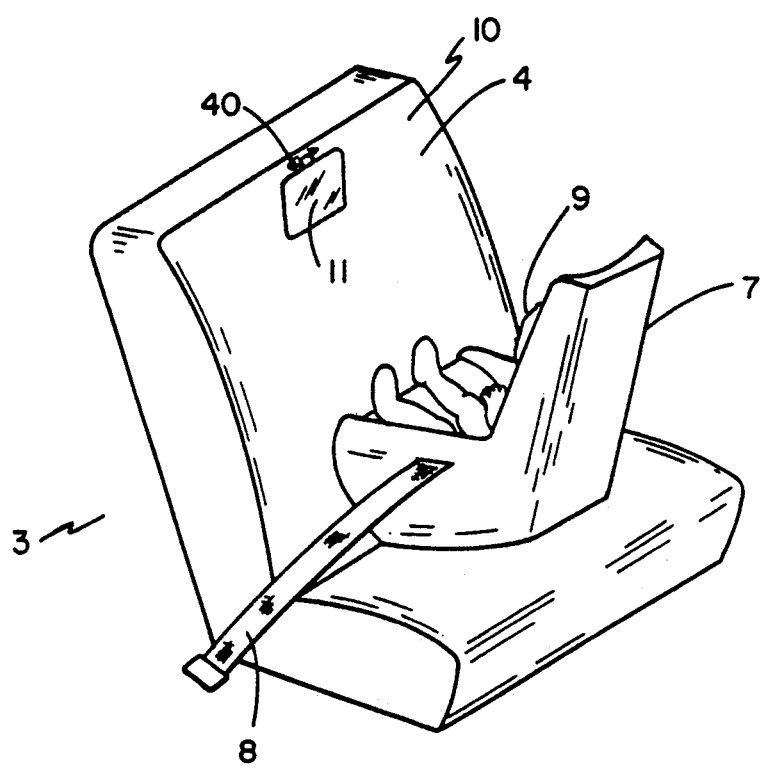
FIG. 1 is a front perspective view of the invention constructed in accordance with the principles of the present invention and being shown in use in an automobile.

Referring to the drawings in detail wherein like elements are indicated by like numerals, there is shown in FIG. 1 a vehicle rear seat 3. The rear seat 3 contains an infant car safety seat 7 attached to the vehicle by means of a seat belt 8. An infant 9 is placed in the infant car seat 7 facing the back rest 4 of the rear seat 3. The device 10 of the present invention is a mirror having a reflecting surface on one 11 of its planer sides and a non-reflecting surface on the obverse side 12, and adapted to being attached to the rear seat back rest 4. This permits a driver (not shown) to observe the infant 9 by means of an image reflected from the subject device 10 to the rear view mirror (not shown) of the vehicle (not shown).

Figure 2:
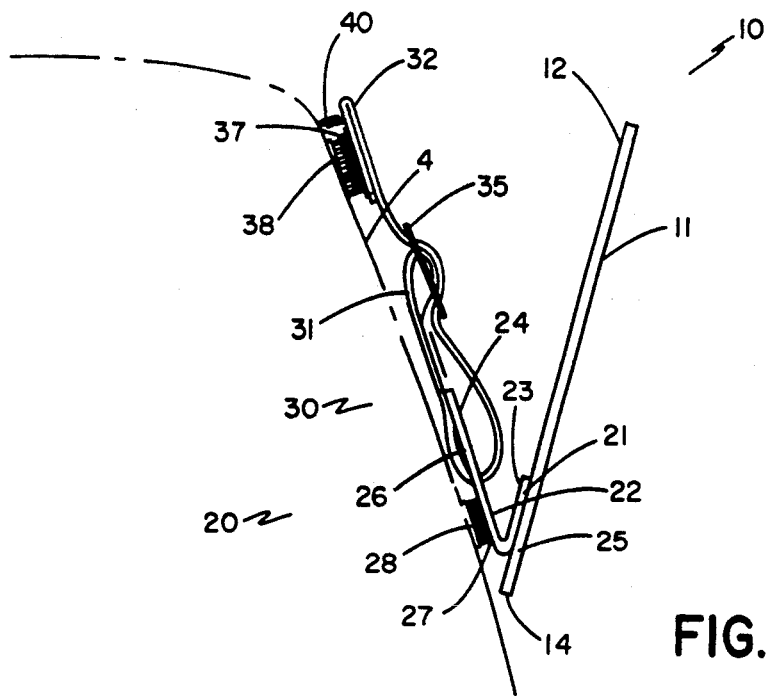
FIG. 2 is a side elevational view of the invention shown in FIG. 1.
Figure 3:
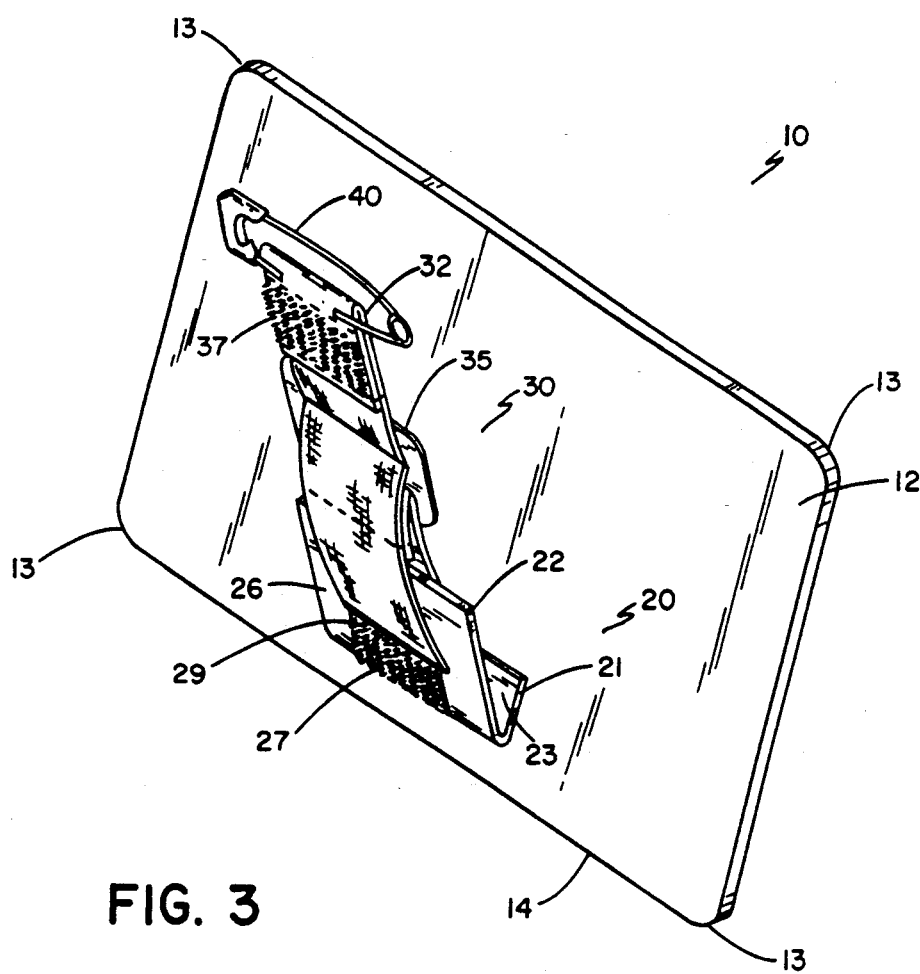
FIG. 3 is a rear perspective view of the invention of FIG. 2.

Referring to FIG. 1, and more particularly to FIGS. 2 and 3, it may be seen that the mirror 10 of the present invention has a generally rectangular, planar shape and is made out of a rigid, light weight material, such as plastic, with a non-glass reflective coating on the mirror reflecting surface side 11 Although rectangular in shape, the planar corners 13 of the mirror 10 are rounded for safety. In this embodiment of the invention, the mirror has a six inch wide horizontal dimension and four inch vertical dimension.

The mirror's non-reflective planar side 12 has a generally wedge-shaped holding element 20 having a V-shaped cross-section centrally attached along the mirror's horizontal axis near to the mirror's bottom edge 14. The holding element has two principle components 21, 22 meeting and joining at a sharply acute angle. The holding element 20 in this embodiment of the invention has a 1 ¾ inch width and is located approximately ⅜ inches from the long bottom edge 14. The holding unit 20 is also made out of a sturdy, light weight material, such as a rigid plastic material.

The two holding element principle components 21, 22 have uneven vertical lengths. Each component 21, 22 also has two faces, one defined as interior 23, 24, i.e., facing, and the other exterior 25, 26, i.e., non-facing. The exterior face 25 of the vertically shorter 21 of the two components is attached to the non-reflective side 12 of the mirror 10. The vertically longer 22 of the two components extends freely upward away from the mirror's non-reflective side 12. The unattached component 22 has an approximate 1⅛ inch horizontal slot 29 formed in the approximate center of the unattached component 22. A hook and pile fastener 27, 28, commonly sold under the Velcro trademark, is used to fasten the holding element 20 to the rear seat back rest 4. A section 27 of Velcro material is fixedly attached to the unattached component exterior face 26. A corresponding adhesive backed section 28 of Velcro material is attached to the rear seat back rest 4.

A strap 30 made of a strong, synthetic material is inserted through the slot 29. One end 31 of the strap 30 is formed into a loop and attached to the central bar of a conventional three-bar buckle 35. The other strap end 32 is threaded through the buckle 35 and extended vertically past the buckle 35. Another hook and pile fastener 37, 38, commonly sold under the Velcro trademark, is used to fasten the strap end 32 to the rear seat back rest 4. A section 37 of Velcro material is fixedly attached to the strap 30 near to the strap free end 32. A corresponding adhesive backed section 38 of Velcro material is attached to the rear seat back rest 4. The strap 30 and the entire mirror 10 are attached to the rear seat back rest 4. The shape of the holding element 20 and its attachment configuration on the mirror's nonreflective surface 12 positions the reflective mirror surface 11 so that the infant 9 may be observed via the vehicle's rear view mirror.

A large safety pin 40 is attached to the strap's free end 32. The strap's free end 32 is attached to the rear seat back rest 4 and provides an anchor means for the mirror. The Velcro fastener means 27, 28 and 37, 38 provide a quick and easy method of making adjustments for height, angle, etc., while the safety pin provides a safe and secure anchor.

The present invention makes use of the optical axis that extends from the eyes of a driver looking into a rear view mirror of a motor vehicle into which is reflected an image from the mirror 10 attached to the rear seat back rest 4. This enables the driver to easily monitor the activity of an infant 9 in a rearwardly facing safety seat 7.

After attachment to the rear seat back rest 4 by means of the safety pin 40 the mirror's reflective surface 11 is further positioned to allow the driver to observe the infant 9 in the car safety seat 7 by adjusting the length of the strap 30 using the buckle 35. Once this is accomplished, the mirror 10 is further secured to the rear seat back rest 4 by the Velcro fastener means 27, 28 and 37, 38.

Thus it can be seen that the device described provides an inexpensive, easily installed and easily re-positioned device by which a driver of a vehicle can monitor the activity of an infant in a safety seat that faces in the opposite direction from the line of sight of the driver.

While the above description contains many specifies, these should not be construed as limitations on the scope of the invention, but rather as an exemplification of one preferred embodiment thereof. Many other variations are possible. For example, in situations where the vehicle seat backs are made of materials other than fabric, use of the safety pin may be undesirable. In these cases, a second Velcro fastener provides an appropriate mechanism for attaching the device to the rear seat of the vehicle.

It is understood that the above-described embodiment is merely illustrative of the application. Other embodiments may be readily devised by those skilled in the art which will embody the principles of the invention and fall within the spirit and scope thereof.

I claim:

1. A device for observing an infant in a rear facing safety seat located in the rear seat of a motor vehicle using the rear view mirror of said vehicle comprising:

a generally rectangular, planar shaped mirror made out of a rigid, light weight material, and having a non-glass reflective coating on one of its planar sides and a non-reflecting surface on the obverse side, said mirror being adapted to being attached to the rear back seat of said vehicle;

a generally wedge-shaped holding element having a V-shaped cross-section centrally attached to said mirror's non-reflective planar side along the mirror's horizontal axis near to the mirror's bottom edge, said holding element having two principle components meeting and joining at a sharply acute angle each having uneven vertical lengths, each of said components having two faces, one defined as interior, and the other exterior, said exterior face of the vertically shorter of the two components being attached to the non-reflective side of the mirror, and the vertically longer of the two components extending freely upward away from the mirror's non-reflective side;

means for attaching said device to the rear back seat of said vehicle; and means for adjusting the positioning of said device so that it reflects the image of the infant from said car safety seat to said rear view mirror.

2. A device according to claim 1, wherein:

said vertically longer component having a horizontal slot formed in its approximate center.

3. A device according to claim 2, wherein the means for attaching said device tot he rear back seat comprises:

a hook and pile fastener comprised of two sections, one section of which is fixedly attached to the exterior face of said vertically longer component, and said second section having an adhesive backing is attached to said rear back seat.

4. A device according to claim 3, wherein the means for adjusting the positioning of said device comprises:

a strap with two ends inserted through said slot, one end of said strap being formed into a loop and attached to a central bar of a conventional three-bar buckle, and the other end of said being threaded through said buckle and extending vertically past said buckle.

5. A device according to claim 4, wherein said strap further comprises:

a safety pin attached to the other end of said strap, whereby said safety pin is attached to said rear back seat.

6. A device according to claim 5, wherein:

the corners of the mirror are rounded.

* * * * *